(12) United States Patent
Alvarez

(10) Patent No.: US 8,579,222 B1
(45) Date of Patent: Nov. 12, 2013

(54) MOTORIZED FISHING REEL DEVICE

(76) Inventor: Antonio Alvarez, Miami, FL (US)

( * ) Notice: Subject to any disclaimer, the term of this patent is extended or adjusted under 35 U.S.C. 154(b) by 136 days.

(21) Appl. No.: 13/400,329

(22) Filed: Feb. 20, 2012

(51) Int. Cl.
*A01K 89/01* (2006.01)

(52) U.S. Cl.
USPC .......... 242/225; 242/224; 242/227; 242/228; 242/250

(58) Field of Classification Search
USPC .................. 242/225–228, 250, 251
See application file for complete search history.

(56) References Cited

U.S. PATENT DOCUMENTS

| | | | | |
|---|---|---|---|---|
| 3,030,733 | A * | 4/1962 | Crawford | 446/30 |
| 3,252,239 | A * | 5/1966 | Moeller | 43/21 |
| 3,438,594 | A * | 4/1969 | Bellefeuille | 242/225 |
| 3,561,695 | A * | 2/1971 | Wood, Jr. | 242/250 |
| 3,735,934 | A * | 5/1973 | Black | 242/387 |
| 4,108,392 | A * | 8/1978 | Masclet | 242/225 |
| 4,771,964 | A * | 9/1988 | Watanabe et al. | 242/250 |
| 4,784,346 | A * | 11/1988 | Steffan | 242/250 |
| 4,932,602 | A * | 6/1990 | Scott | 242/394.1 |
| 5,088,657 | A * | 2/1992 | Chen | 242/225 |
| 5,878,523 | A * | 3/1999 | Wenzel | 43/21 |
| 5,954,285 | A * | 9/1999 | Whisenhunt | 242/250 |
| 6,056,219 | A * | 5/2000 | Barkley | 242/225 |
| 6,896,216 | B2 * | 5/2005 | Chiba | 242/250 |
| 2006/0076444 | A1 * | 4/2006 | Westhoff | 242/225 |

* cited by examiner

*Primary Examiner* — Emmanuel M Marcelo
(74) *Attorney, Agent, or Firm* — Sanchelima & Associates, P.A.

(57) ABSTRACT

A motorized fishing reel device with a selectively actuated rotably mounted and motorized spool with a fishing line wound thereon. A mechanism for guiding the winding and unwinding of the line wound in a spool. The mechanism ensures that the line is properly wound when the spool is substantially coaxially aligned with the line in order to provide an ergonomically compatible handling of the device. A motor assembly with step-down and step-up gear assemblies that provide the rotational energy to the spool assembly and the reciprocating movement to a traveling pin with a line guiding roller at its distal end. A leg assembly that doubles as a storage compartment for back-up batteries is rotably mounted at one end to the housing assembly.

9 Claims, 8 Drawing Sheets

Fig. 4A   A-A

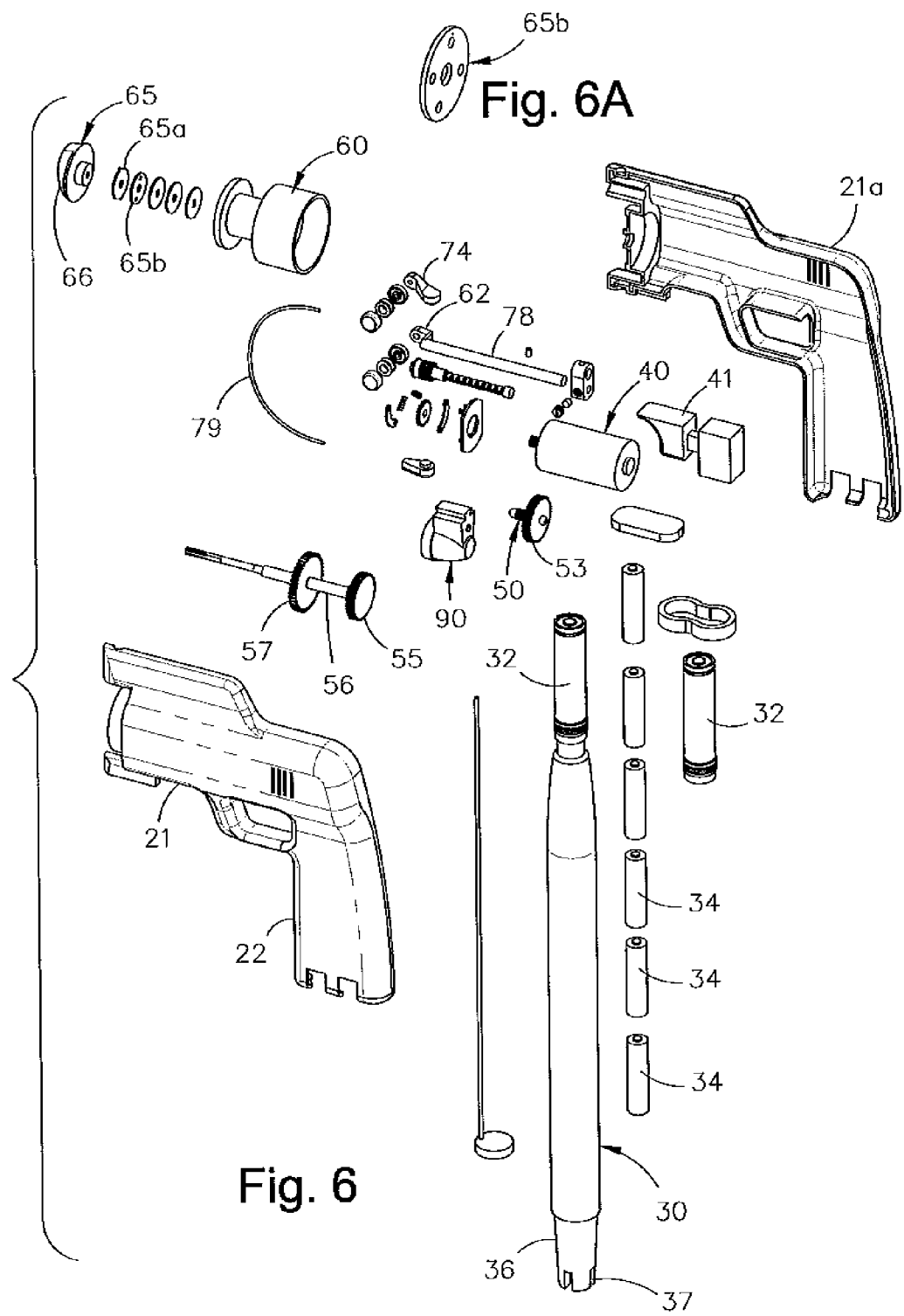

MOTORIZED FISHING REEL DEVICE

BACKGROUND OF THE INVENTION

1. Field of the Invention

The present invention relates to a motorized fishing reel device, and more particularly, to such a device that is battery powered.

2. Description of the Related Art

Several designs for fishing reels have been designed in the past. None of them, however, include an ergonometric design that can be readily used to facilitate reeling-in operations typically encountered when fishing.

SUMMARY OF THE INVENTION

It is one of the main objects of the present invention to provide a motorized fishing reel device that is ergonometric and easy to operate.

It is another object of this invention to provide a device that permits a user to selectively and easily reel in a fish and lock or release the reel.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4A is a cross-sectional side elevational view of traveling member 72 taken from sections line A-A in FIG. 4.

FIG. 6 is an exploded view showing the different components for the embodiment shown in the previous figures.

FIG. 6A shows a washer with ball bearing members 65b that cooperates with washers 65a to provide the needed clutching action.

DETAILED DESCRIPTION OF THE EMBODIMENTS OF THE INVENTION

Figures 1, 1A:
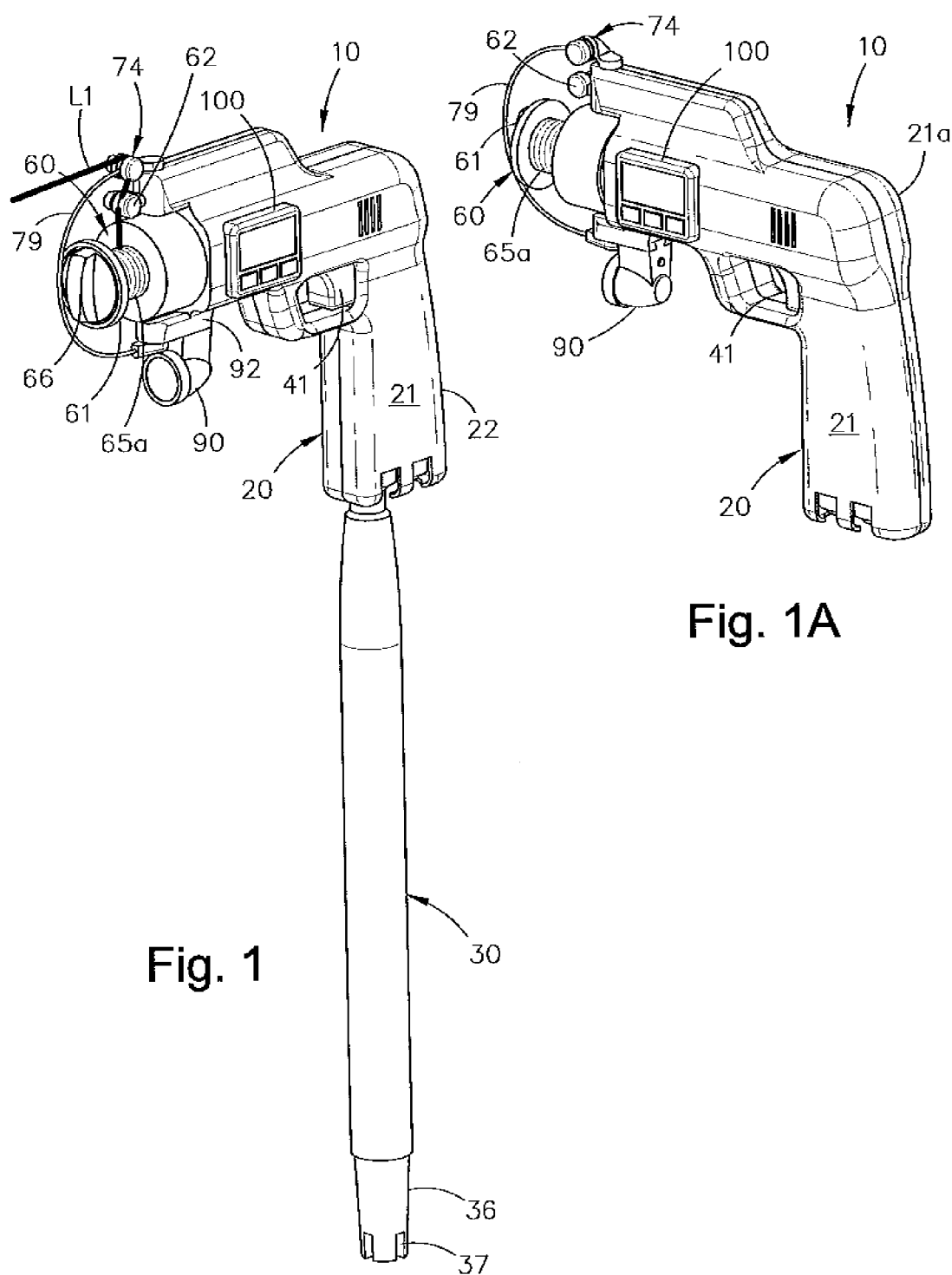
FIG. 1 represents an isometric view of an embodiment for the present invention generally referenced with numeral 10, including housing assembly 20 mounted to assembly 30. Line $L_1$ represents the fishing line $L_1$ over line guiding roller 74 and line guiding roller 62.
FIG. 1A is an isometric view of the embodiment shown in the previous figure from a different angle and without leg assembly 30.

Referring now to the drawings, where the present invention is generally referred to with numeral 10, it can be observed that it basically includes housing 20 with leg assembly 30 mounted to housing 20, and spool assembly 60, with line $L_1$ (or $L_2$) wound thereon. A user actuates trigger 41 that causes motor assembly 40 to rotate spool assembly 60, and line guiding member or bail 79 is moved as a esult of the reciprocating movement of traveler assembly 70, as discussed below and shown in the different figures.

Housing 20 comprises, in one of the embodiments, halves 21 and 21a that are complementary to each other to house most of the components that will be described below. Housing 20 has an ergonomic shape that resembles a pistol and more closely a conventional electric drill with handle portion 22.

Figure 2:
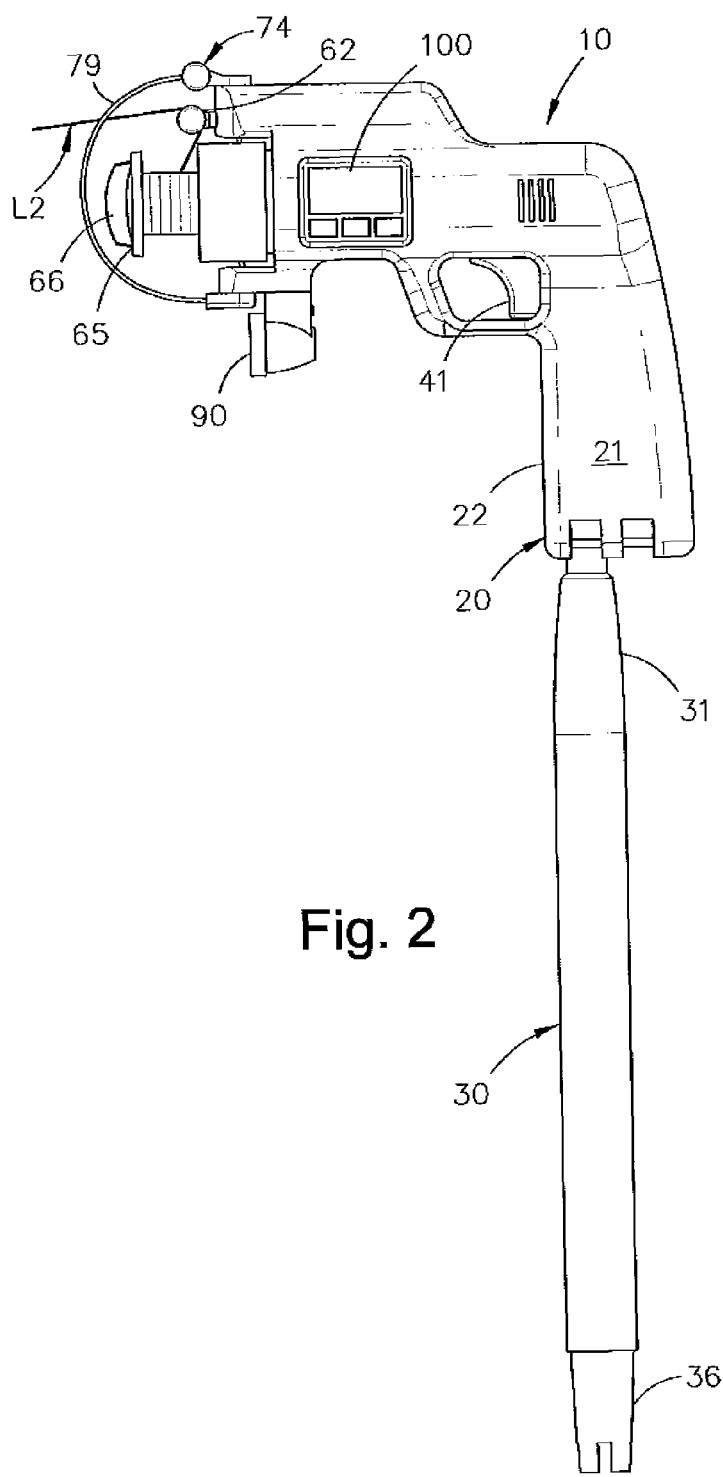
FIG. 2 shows an elevational side view of the embodiment shown in the previous figures with line $L_2$ being trained over line guiding roller 62 directly for fast winding and more power.
Figure 2A:
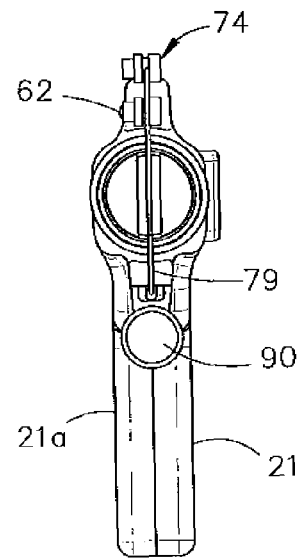
FIG. 2A is a front elevational view of the embodiment shown in the previous figure without leg assembly 30.

In FIGS. 1, 1A, and 2, motorized fishing reel device 10 is shown with spool assembly 60 that protrudes outside housing 20. In FIG. 1, line $L_1$ is shown trained over line guiding roller 74 that cooperates with bail 79 to ensure proper tension on the fishing line. In FIG. 2, line $L_2$ is represented as being trained directly over line guiding roller 62. In this configuration, the pulling force on line $L_2$ is directly transmitted from motorized spool member 61.

Figure 3:
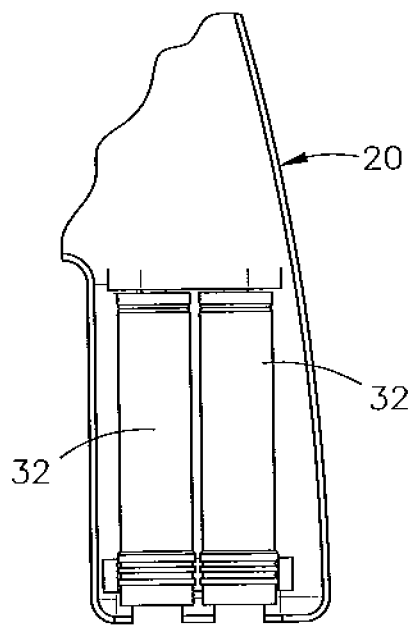
FIG. 3 illustrates a partial cross-sectional view of a portion of housing 20 and leg assembly 30 with battery assembly 80 housed therein.
Figure 3A:
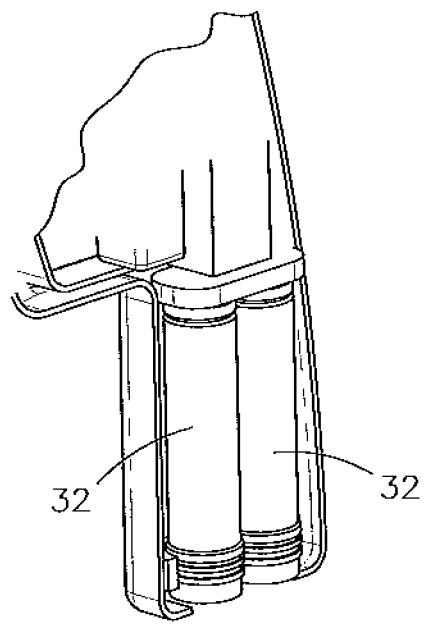
FIG. 3A shows the cross-sectional representation illustrated in the previous figure from another angle.

Leg assembly 30 is removably mounted to the underside of handle portion 22 of housing 20. Leg assembly 30 also houses battery assembly 80 thereon to selectively provide the necessary electric power to motor assembly 40, as best seen in FIGS. 3 and 3A. In one of the embodiments, battery assembly 80 includes main battery cell 32 that is necessary for device 10 to operate when leg assembly 30 is detached. Additionally, and optionally, a bank of conventional battery cells 34 can be used as backup for device 10. Leg assembly 30 thus provides structural support and also functions as a storage or holder for backup electrical power. The combination of battery cells 34 can be accomplished conventionally providing suitable voltage levels when connected in series and parallel. Optionally, a battery charger indicator 100 may be provided to monitor the electrical charge of the batteries. Leg assembly 30 provides structural support that provides a resting function when foot 36 comes in contact with a horizontal surface. Housing 20 removably and rotably connects with one end 31 of leg assembly 30 to permit housing 20 to freely rotate. This is particularly important when leg assembly 30 is partially inserted inside a holder (not shown) typically found in watercrafts. Slots 37 cooperatively receive cross-pins (not shown) found in the holders (typically found in fishing boats to hold fishing rods) to prevent rotation of leg assembly 30.

Figure 4:
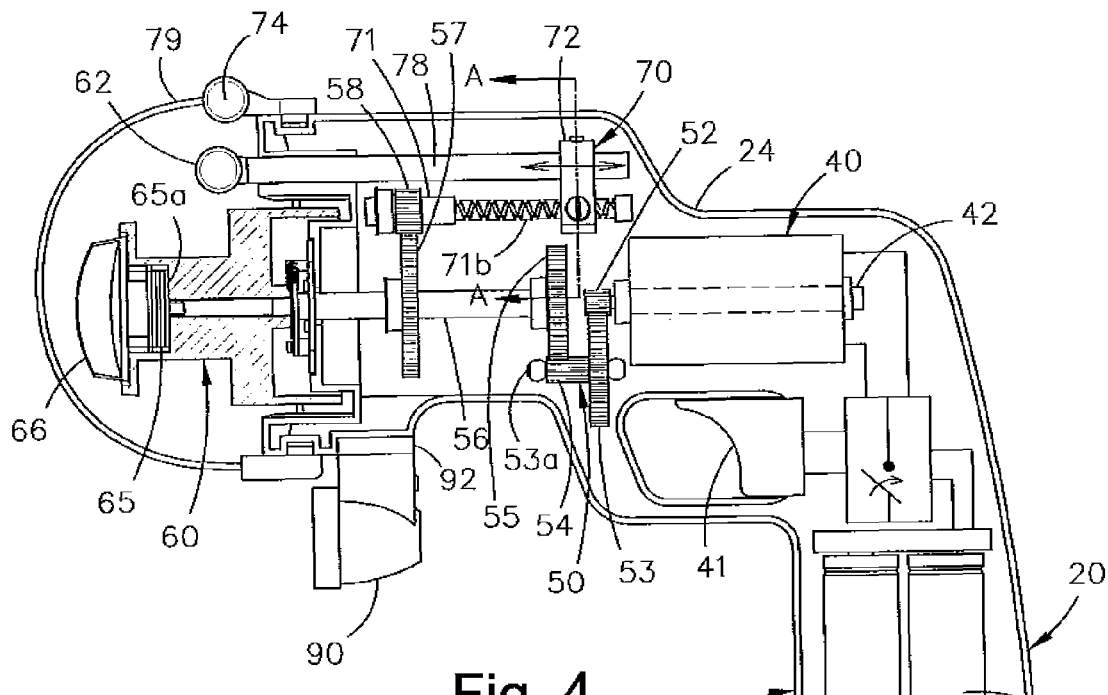
FIG. 4 is an elevational cross-sectional representation of device 10 and a portion of leg assembly 30, showing the internal elements of one of the embodiments shown herein.
Figure 4B:
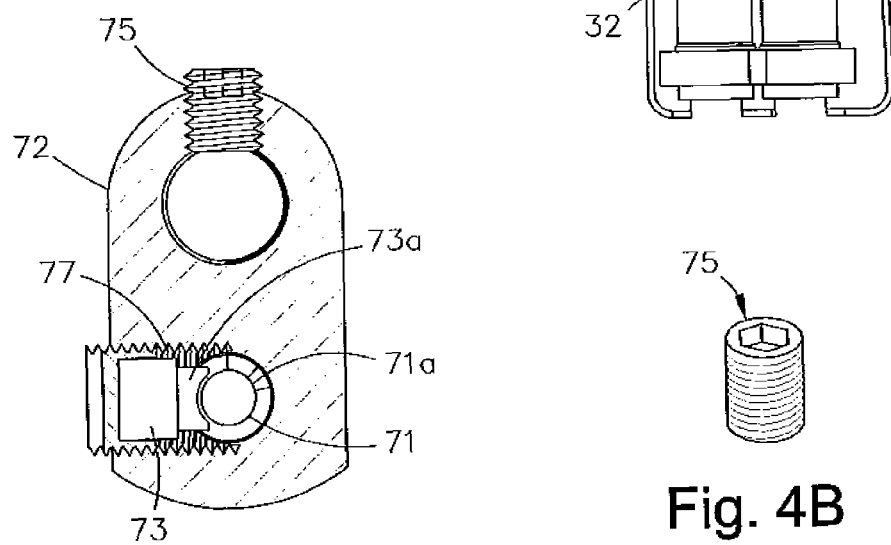
FIG. 4B represents a fastening member 75 used to secure traveling member 72 to traveling pin 78.

FIG. 4 shows the disposition of the internal components as arranged in one of the preferred embodiments. Motor assembly 40 is mounted inside housing 20, above handle portion 22, and its rotating motor shaft 42 extends axially and longitudinally inside body portion 24 of housing 20. One of the protruding ends of shaft 42 is coupled with pinion gear 52 of gear assembly 50. Pinion gear 52 is meshed with reducing or step-down gear 53 that in turn has pinion gear 54 rigidly and coaxially mounted to axle 53a. Pinion gear 54 is meshed with reducing or step-down gear 55 mounted to drive shaft 56, as shown. Shaft 56 provides rotational movement to spool member 61 through clutch assembly 65. Assembly 65 consists of several abutting clutch washers 65a that are frictionally engaged against each other. The resistance to their relative movement is controlled by clutch adjusting knob 66 that a user turns to adjust the slippage that clutch washers 65a are allowed to have. Clutch washers 65a are also shown in FIG. 6. One of these washers 65a include ball bearing members, which are referenced with numeral 65b. In this manner, the pulling force transmitted through spool member 61 is adjusted or limited. The effective pulling force of spool assembly 60 is thus selectively adjusted. Equivalent clutch or brake assemblies can be used, obtaining equivalent results.

Step-up gear 57 is rigidly and coaxially mounted to shaft 56 and is meshed with pinion gear 58 that is rigidly and coaxially mounted to driven shaft 71.

Traveler assembly 70 generates a reciprocating movement for traveling member 72 as threaded driven shaft 71 rotates, as best seen in FIG. 4A. Driven shaft 71 includes a portion that is referred to as worm shaft 71b. Plug member 73 is mounted inside threaded opening 77 with guide tooth or pawl member 73a cammingly coacting with internal thread 71a of driven shaft 71. Fastening member 75, like a set of screws, keeps traveling pin 78 mounted to traveling member 72.

When a user actuates trigger 41, motor assembly 40 causes spool assembly 60 to rotate while, simultaneously, a reciprocating movement is imparted to traveling member 72 that in turn is transmitted to traveling pin 78 that, in turn, has line guiding roller 62 at its distal end for ensuring that line $L_1$ (or $L_2$) is properly wound in spool assembly 60. With cooperatively disposed bail 79, a user can reel in a fish with minimum effort. Bail 79 can be used or moved out of the way by a user.

Figure 5:
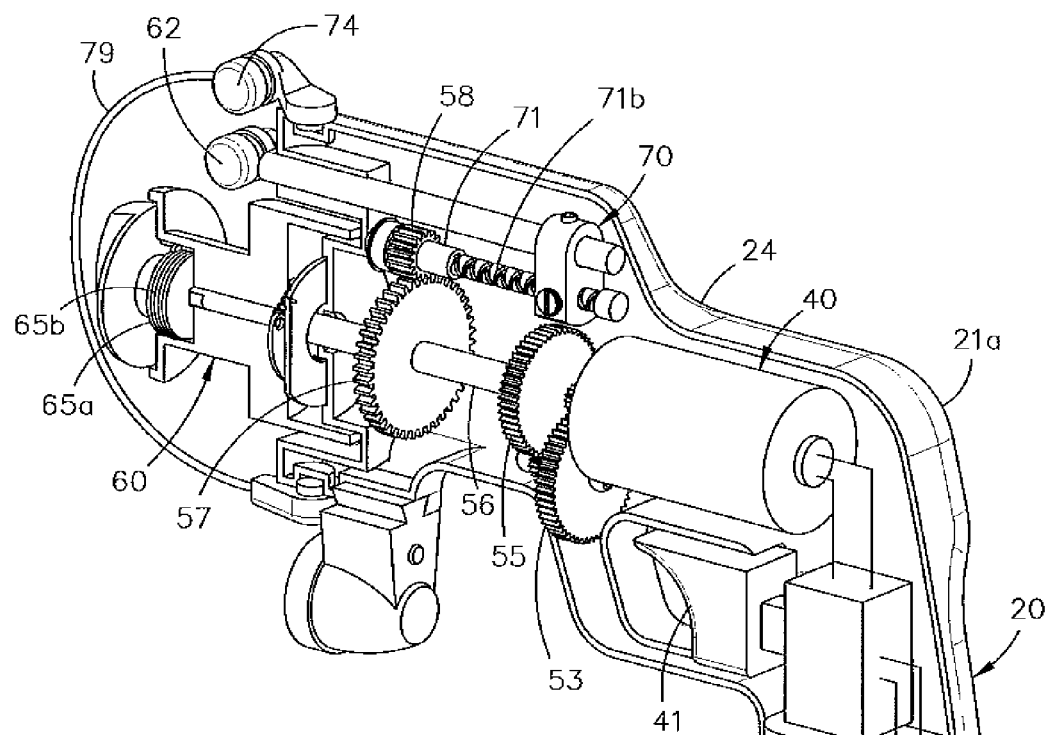
FIG. 5 shows an isometric representation of the components inside housing 20 of the embodiment for the present invention represented in the previous figures.
Figure 5A:
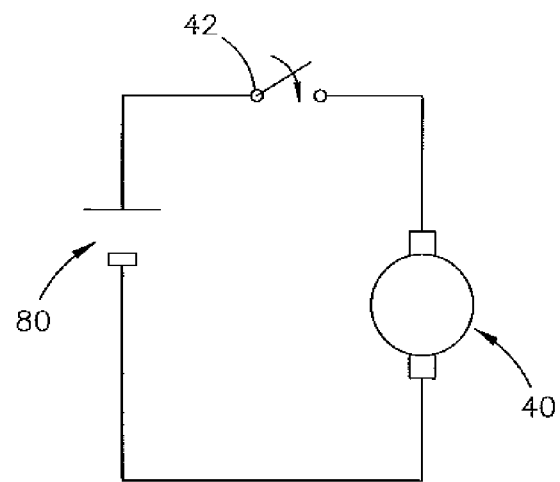
FIG. 5A shows the electrical circuit for selectively powering motor assembly 40.
Figure 7:
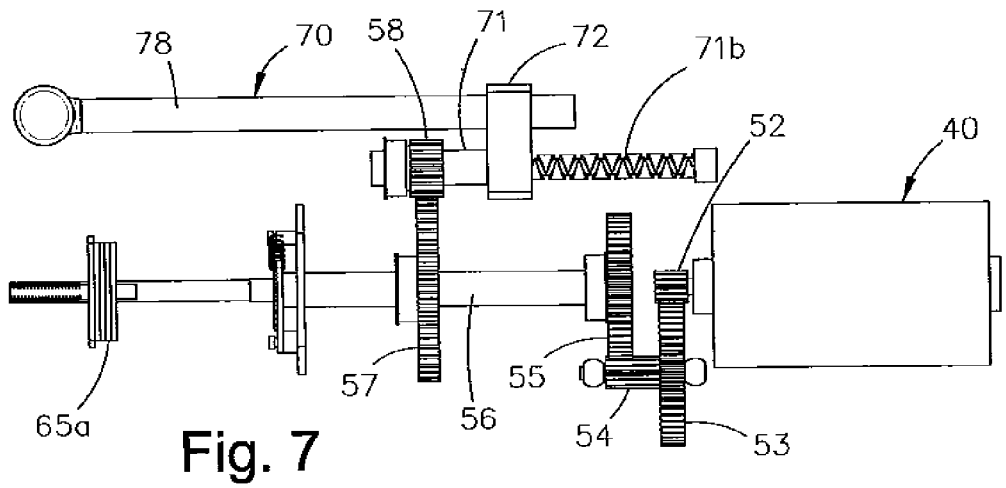
FIG. 7 is an elevational view of gear assembly 50 and traveler assembly 70 with traveling pin 78 in the outermost (to the left) position.
Figure 7A:
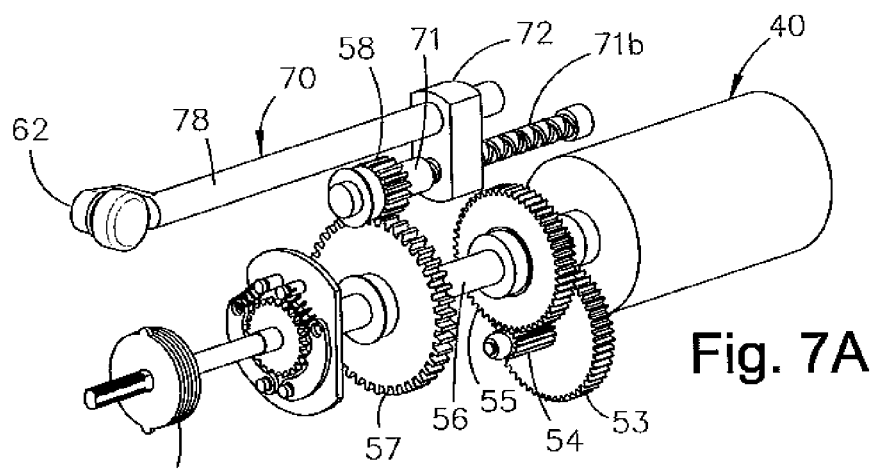
FIG. 7A shows the assemblies represented in the previous figures in an isometric view, as seen from the front.
Figure 7B:
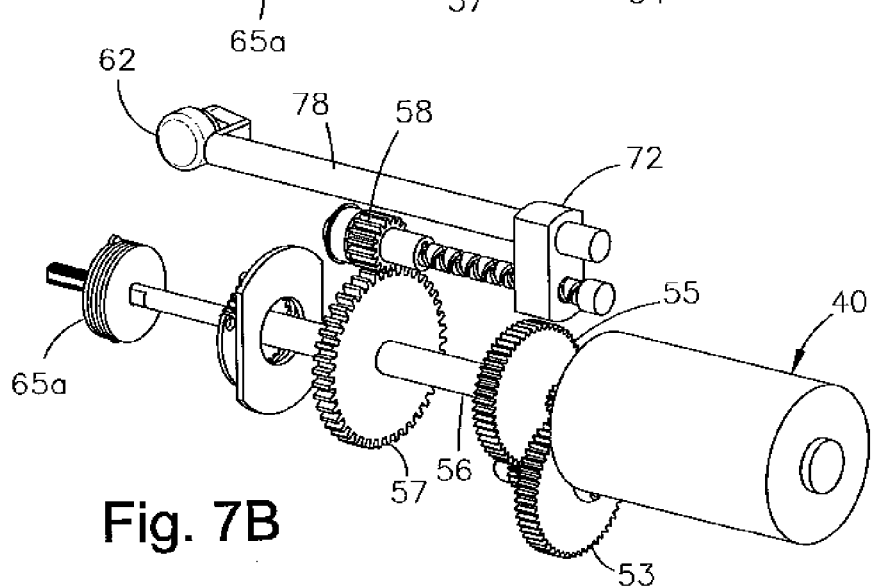
FIG. 7B is a representation of the mechanism shown in the previous figure from a different angle.
Figure 9:
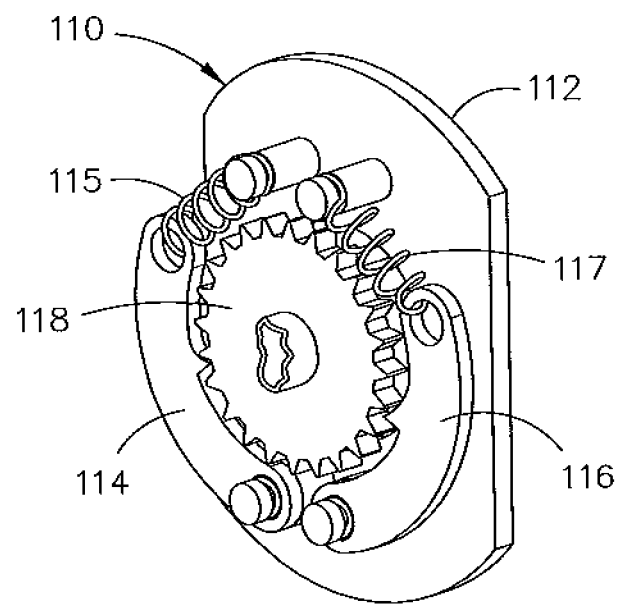
FIG. 9 shows ratchet and alarm assembly 110 including supporting plate 112 and ratchet wheel 118 disposed at a parallel and spaced apart relationship with respect to supporting plate 112 to cooperatively coact with ratchet and alarm pawl members 114 and 116, respectively.

As best seen in FIG. 9, ratchet and alarm assembly 110 includes supporting plate 112 that is mounted intensively to housing 20. Ratchet wheel 118 is rigidly mounted to shaft 56 that passes through opening 112a, best seen in FIG. 5. Ratchet wheel 118 is disposed at a parallel and spaced apart relationship with respect to supporting plate 112 to cooperatively coact with ratchet and alarm pawl members 114 and 116, respectively. Ratchet and alarm pawl members 114 and 116 are urged against ratchet wheel 118 by bias springs 115 and 117, respectively.

Ratchet pawl member 114 prevents ratchet wheel 118 from rotating in a certain direction. Alarm pawl member 116 is free running and intended to emit an alerting noise with pitch that is a function of the rotational speed of ratchet wheel 118.

Figure 8:
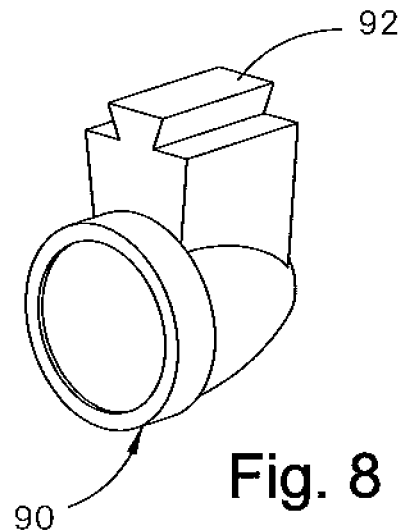
FIG. 8 is an isometric view of a lamp assembly 90 that is removably mounted to hot shoe 92 on housing 20.

In FIG. 8, a lamp assembly 90 is shown with hot shoe 92. As seen in FIG. 4, lamp assembly 90 is removably mounted to the underside of housing 20 and positioned to cooperatively guide a beam of light to predetermined areas in front of a user. Optionally, lamp assembly 90 can be replaced with a video camera with or without a lamp.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A motorized fishing reel device comprising:
A) a housing having a handle portion;
B) a selectively actuated electrical motor assembly mounted within said housing with a first shaft wherein said shaft rotates at a predetermined selectable first rotational speed;
C) a first gear assembly for transmitting and stepping down said first rotational speed to drive a second shaft at a stepped-down second rotational speed;
D) a spool assembly driven by said second shaft at said second rotational speed and said spool assembly including a spool member and a line wound thereon;
E) a second gear assembly for transmitting and stepping up said second rotational speed to drive a third shaft at a third rotational speed;
F) a traveler assembly driven by said third shaft at said third rotational speed to produce a reciprocating movement on a traveling pin mounted at a spaced apart axial disposition with respect to the axis of said spool member for guiding the winding and unwinding of said line in said spool member;
G) a ratchet assembly for preventing the rotation of said first shaft in one direction; and
H) a battery assembly for powering said motor assembly.
2. The device set forth in claim 1 wherein said traveler assembly includes a driven shaft with a double thread and a traveling member with a through opening for receiving said driven shaft therethrough, said traveling member including a guiding pawl member cooperatively and cammingly engaged with said double thread to cause said reciprocating movement of said traveling member, said traveling member further including a traveling pin mounted thereon and disposed at a parallel and spaced apart relationship with respect to said driven shaft and including a distal end with a line guiding roller mounted thereon to guide said line when wound and unwound by said spool assembly.
3. The device set forth in claim 2 wherein said spool assembly includes a clutch assembly for adjusting the effective pulling force of said spool assembly.
4. The device set forth in claim 3 further including:
I) a leg assembly having first and second ends, said first ends being rotably mounted to said handle portion.
5. The device set forth in claim 4 further including a bail pivotally mounted to said housing and extending over said spool assembly for cooperatively and selectively coacting with said line.
6. The device set forth in claim 5 further including a lamp mounted to said housing so that a beam of light is directed to an area in front of said device.
7. The device set forth in claim 6 wherein said leg assembly includes a compartment for storing back-up batteries.
8. The device set forth in claim 7 further including:
J) a switch assembly for selectively interrupting the power connection to said motor assembly.
9. The device set forth in claim 7 further including an alarm assembly comprising a free running alarm pawl driven by the rotation of said first shaft to produce a noise pitch associated with the rotational speed of said first shaft.

* * * * *